(12) United States Patent
Smith

(10) Patent No.: US 7,373,684 B1
(45) Date of Patent: May 20, 2008

(54) EYEGLASS CLEANER KIT

(76) Inventor: Warren L. Smith, 212 Hamshire Dr., Cranberry Township, PA (US) 16066

( * ) Notice: Subject to any disclaimer, the term of this patent is extended or adjusted under 35 U.S.C. 154(b) by 575 days.

(21) Appl. No.: 11/137,648

(22) Filed: May 25, 2005

(51) Int. Cl.
  *G02C 13/00* (2006.01)
(52) U.S. Cl. .............................. 15/4; 15/22.1; 15/22.2; 15/24; 15/29; 15/97.1
(58) Field of Classification Search ...................... 15/4, 15/22.1, 22.2, 24, 29, 97.1
  See application file for complete search history.

(56) References Cited

U.S. PATENT DOCUMENTS

| | | |
|---|---|---|
| 3,008,161 A | 11/1961 | Jensen |
| 4,034,432 A | 7/1977 | Sullivan |
| D293,980 S | 2/1988 | Bilbrey et al. |
| 5,222,268 A | 6/1993 | Snodgrass |
| 5,495,632 A | 3/1996 | Baker |
| 5,974,612 A * | 11/1999 | Cathcart ........................... 15/4 |
| 5,988,910 A | 11/1999 | Yahav |
| 2001/0005915 A1 * | 7/2001 | Naghi et al. .................. 15/1.52 |

FOREIGN PATENT DOCUMENTS

| | | | |
|---|---|---|---|
| EP | 871056 | * | 10/1998 |
| FR | 2583532 | * | 12/1986 |
| JP | 61-198117 | * | 9/1986 |
| WO | 2004/113997 | * | 12/2004 |

* cited by examiner

*Primary Examiner*—Mark Spisich
(74) *Attorney, Agent, or Firm*—Lawrence J. Gibney

(57) ABSTRACT

This device is used to clean and dry lens of eyewear. The entire device is contained in one unit and will provide the appropriate motion or movement to accomplish the cleaning of the eyewear using brushes and drying pads.

1 Claim, 3 Drawing Sheets

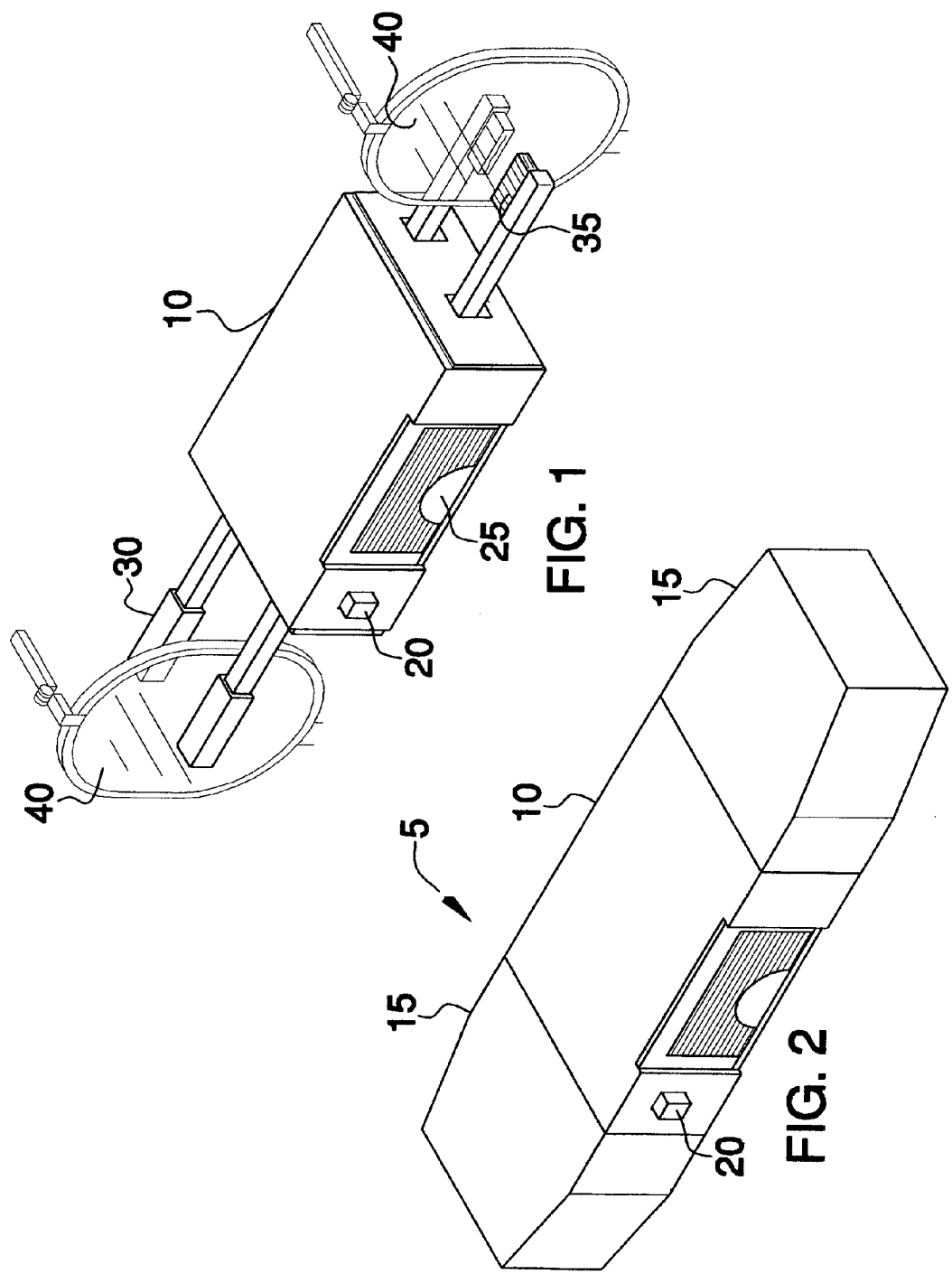

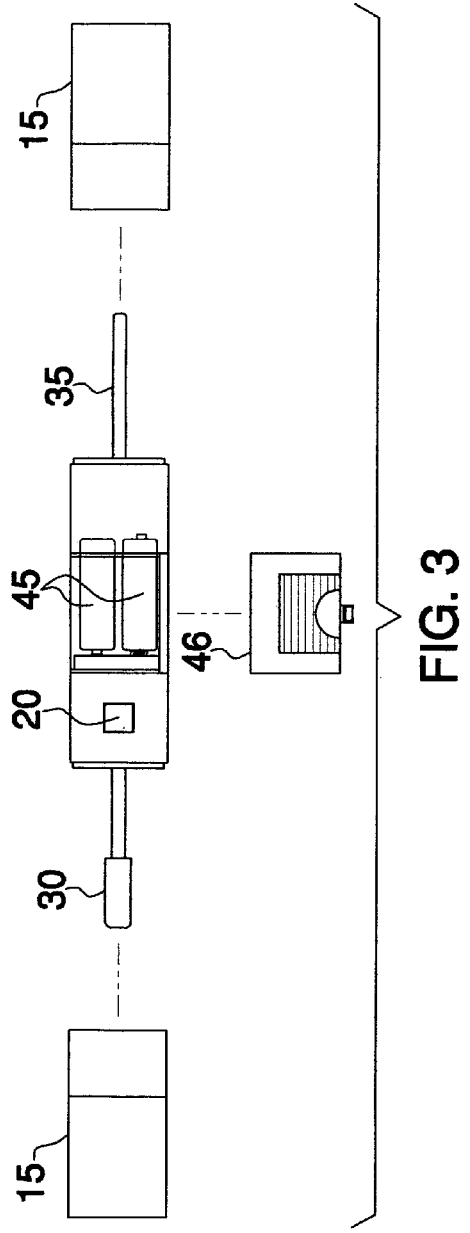
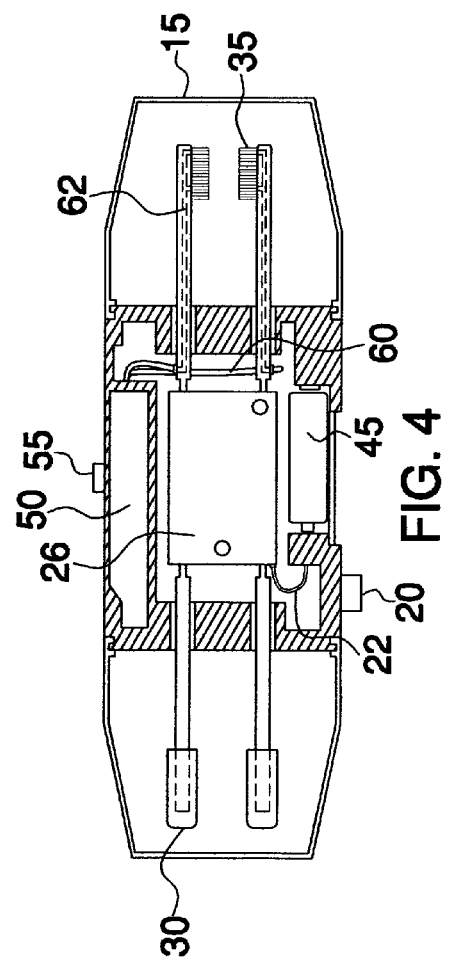

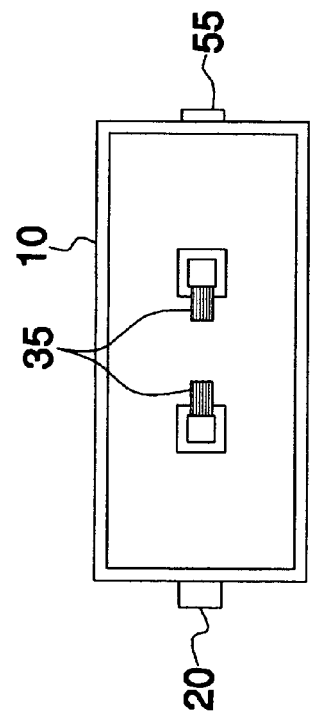
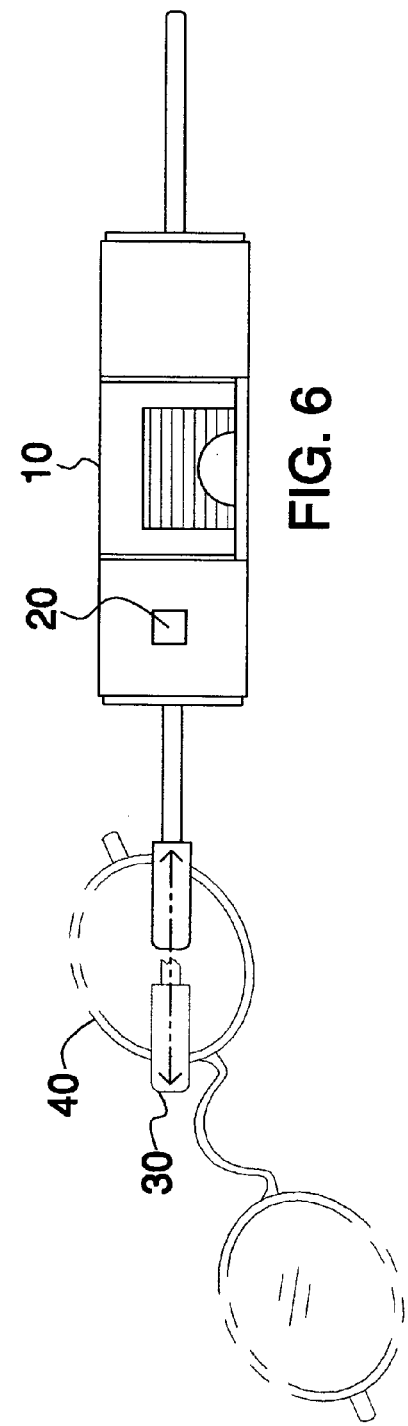

EYEGLASS CLEANER KIT

CROSS REFERENCE TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

This relates to the cleaning of eyewear and in particular eyeglasses. It is not unusual for dirt, dust, or other particles to accumulate on eyeglasses, therefore requiring the eyeglasses to be cleaned in order to maintain clarity of vision.

B. Prior Art

There are many other prior art references related to the cleaing of eyewear or eyewear maintenance devices. Some examples include Snodgrass, U.S. Pat. No. 5,222,268, Jensen, U.S. Pat. No. 3,008,161 and Yahav, U.S. Pat. No. 5,988,910. Some eyeglass cleaners are also motorized; an example of this type is Baker, U.S. Pat. No. 5,495,632.

None of the above referenced patents, however, incorporate all the design features that have been included in the current device.

BRIEF SUMMARY OF THE INVENTION

This device will have all the necessary equipment to clean eyeglass lenses. It is often a problem with eyeglass wearers that dust or other particles fall on the eyeglass. In order to maintain proper vision the eyeglass lens must be frequently cleaned. This is usually done with water or a cleaning solution and some type of cloth for drying purposes.

It is an object of this device to include all necessary equipment to clean the eyeglasses using fluid as well as a mechanism to dry the fluid once it has been placed on the eyeglass lens.

Additionally, it is also an object of this device to house the device in a self-contained unit for ease of use and portability.

One end of the device is equipped with brushes and a mechanism to place some sort of cleaning solution through the brushes and onto the lenses. A release button for the fluid will also be incorporated to place the cleaning solution onto the lenses.

On the opposite end of the body will be drying pads to dry the lens once the fluid has been applied to the lens.

This device is motorized and an On/Off switch and the appropriate electrical circuitry and associated equipment will provide the appropriate action to provide cleaning of the lenses. This device will be operated using a power source such as a battery or a series of batteries. Appropriate wiring will also be provided to insure that all electrical connections have been provided.

End caps will be provided to protect the drying pads and brushes when the device is not being used.

BRIEF DESCRIPTION OF THE DRAWINGS

FIG. 1 is an isometric view of the device in use.

FIG. 2 is a isometric view of the device with the end caps installed in place.

FIG. 3 is a side view of the device with the end caps open and the battery compartment shown.

FIG. 4 is a cross sectional view of the device with the ends caps installed.

FIG. 5 is a front view of the brushes.

FIG. 6 is a front view of the device showing the movement of the drying pads.

DETAILED DESCRIPTION OF THE EMBODIMENT

This device 5 is a self-contained unit to clean eyeglasses. It will be comprised of a series of brushes 35 on one end and a series of drying pads 30 on the other end. FIG. 1 The entire unit will be contained in a casing or body 10. End caps 15 will be provided to protect the brushes 35 and drying pads 30 when the device is not being used. FIG. 2

An on/off switch 20 will allow the appropriate movement of the brushes 35 as well as the drying pads 30 when the device is in use. It is likely that this device will be operated with a battery or a series of batteries 45. Appropriate wiring 22 is also provided to provide the necessary electrical connections. A small motor 26 will be housed in the approximate middle of the device and will be connected to the power source using the wiring 22. The motor will provided the necessary motion for the brushes and the drying pads, when needed. The batteries 45 will be contained in a battery compartment 25. FIG. 3, 4 In operation the brushes 35 and drying pads 30 are operated using the on/off switch 20.

When not in use the end caps 15 cover the brushes 35 and the drying pads 30 to protect them. This device will likely be carried in a person's purse or pocket. The end caps 15 will be secured to the body by a snap mechanism.

In order to clean the lens 40 of the eyeglasses the device 5 will be equipped with a cleaning fluid reservoir 50 and a fluid release button 55. Appropriate tubing 60 will allow the cleaning fluid to flow from the reservoir 50 to a channel 62 and eventually to the bristles of the brushes 35. This tubing 60 and channel 62 will allow cleaning fluid to be applied to the lens 40 of the eyewear. The specific type of cleaning solution is not being claimed as part of this application but the solution should flow freely from the reservoir 50 through the tubing 60 and the channel 62 to the brushes 35. FIG. 4 A means to access the fluid cleaning reservoir is provided.

An access to the battery compartment 25 will also be provided in order to change the batteries 45 in the event that it becomes necessary.

Because of the delicate nature of eyeglasses the brushes 35 will be designed specifically to clean an eyeglass lens without defacing the lens. The specific type of brush 35 is not being claimed as part of this particular device.

As the on/off switch 20 is operated the brushes 35 will move in an appropriate fashion to clean an eyeglass lens. Cleaning fluid 50 may be released from the reservoir 50 and travel through the tubing 60 and into an interior channel 62 to apply the cleaning fluid through the brushes 35 to the eyeglass lens 40. FIG. 4

A motor 26 is provided which will provide the appropriate movement of the brushes 35 and the drying pads 30. The motor 26 is connected to the batteries 45, on/off switch 20 and the necessary wiring 22.

The lens 40 after the application of the cleaning fluid is then placed on the drying pads 40 for appropriate drying. The drying pads 30 are intended to be replaceable; the brushes 35 are also intended to be replaceable. Again the motor will operate the drying pads 30 and provide the needed movement. FIG. 6 The specific material that will be used with the drying pad is not claimed but the appropriate choice of material should not deface or damage the eyeglass lens.

The invention claimed is:

1. A device of cleaning lenses of eyeglasses, comprising:
   a) a casing having first and second ends;
   b) a motor and a power source provided within the casing;
   c) a cleaning fluid reservoir provided within the casing;
   d) a pair of drying pads extending from one of the ends of the casing and wherein a lens in adapted to be placed between the pads;
   e) a pair of brushes extending from the other end of the casing and wherein a lens is adapted to be placed between the brushes, each brush including an elongated member extending from the casing and including a fluid channel extending along the length thereof;
   f) an on/off switch operatively coupled to the motor, each of the brushes and drying pads being coupled to the motor such that they are driven for movement by the motor upon actuation of the switch;
   g) a fluid release button located on a surface of the casing and operatively coupled to the fluid reservoir such that fluid from the reservoir may be selectively directed from the reservoir through the fluid channels of the brushes to bristles of the brushes so as to soak the bristles thereof;
   h) wherein the casing is further provided with means providing access to the power source and the fluid reservoir; and
   i) a pair of end caps are provided, each of the end caps adapted to be engaged with the casing for covering the brushes and drying pads when the device is not being used.

* * * * *